3,204,480
MOTION AND POWER TRANSMISSION MEANS

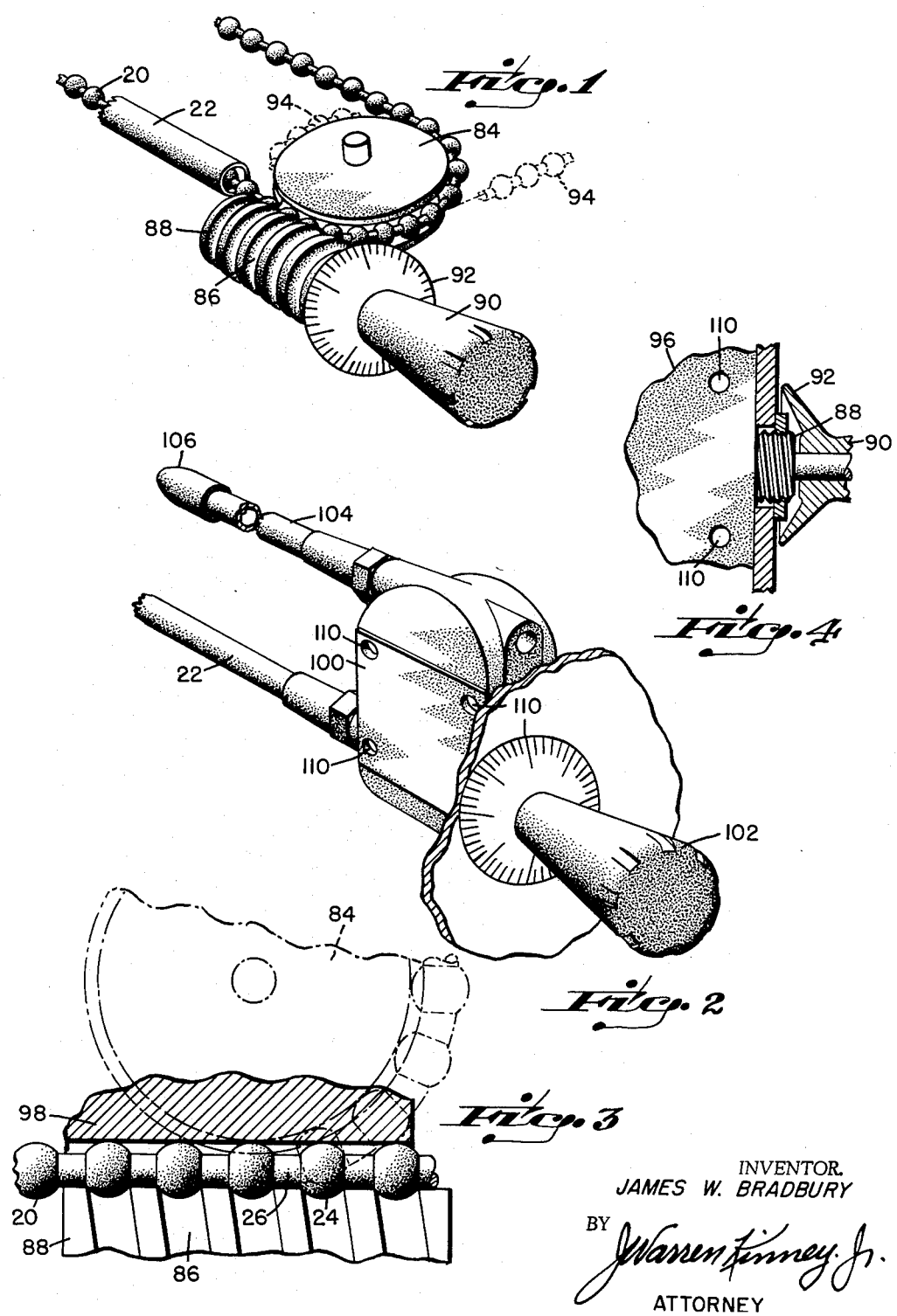

James W. Bradbury, Middletown, Ohio, assignor to Forward Corporation, West Middletown, Ohio, a corporation of Ohio
Filed Jan. 28, 1963, Ser. No. 254,213
3 Claims. (Cl. 74—425)

This invention relates to a power and motion transmission means which is extremely quiet in operation and practice various applications of the system.

An object of the invention is to provide new and advantageous means for transmitting motion or power in flexible shaft fashion.

Another object is to provide motion or power transmission means which is extremly quiet in operation and relatively free of transmission loss due to friction.

A further object is to provide a motion or power transmission means which is simple and economical to manufacture and assemble.

Another object is to provide a push-pull type of motion or power transmission means of simplified construction, which is positive in action and substantially free of lost motion, and which may be used to transmit rotary as well as linear motion simultaneously or selectively, with equal effectiveness.

Another object of the invention is to provide an improved flexible shaft type of driving means whereby either rotary or linear motion may be transmitted with ease around relatively sharp turns or bends, and wherein the driving means has no preferential direction of rotation limitation such as characterizes the conventional wound core type of drive.

Another object is to provide an improved transmission device of the character stated, which is self-lubricating, light in weight, and non-conductive of electric current, these qualities serving to very materially widen the scope of use to environmental conditions or applications not heretofore possible or practical with conventional flexible drive transmissions.

The foregoing and other objects are attained by the means described herein and illustrated upon the accompanying drawings, in which:

FIG. 1 is a perspective view, casing omitted, showing a prime mover adapted to convert applied rotary motion of an actuator element to linear motion of the core element.

FIG. 2 is a perspective view similar to FIG. 1, but with casing applied, and indicating a slight modification.

FIG. 3 is a fragmentary enlarged cross-section of the FIG. 1 worm arrangement, with alternative guide means indicated for producing linear movement of the core element incident to rotation of the driving worm.

FIG. 4 is a cross-section detail through the calibrated driving handle of FIG. 2, taken on the handle axis.

Throughout the drawings, the character 20 indicates generally an elongate core or core element slidable and/or rotatable within a sheath or tube 22 that confines the core element with slight working clearance, permitting either rotational or linear movement of the core element therein. The tubing in some applications may be substantially rigid, whereas in other applications it may be bendable for changing the direction of extension of the core element, which latter is flexible transversely of its length like any conventional cable core of a common flexible shaft drive.

The core element as herein disclosed is preferably a molded plastic string constituted of alternate balls or beads 24 and spacers 26, FIG. 3, the balls being about twice the size of the spacers in diameter. The balls preferably are spherical, and should clear the inside wall of the tube 22, FIG. 1, by about .004 inch. With such an arrangement, the balls may slide or rotate freely inside the tube with minimal frictional contact.

To further minimize friction of the balls upon the tube wall, and to render them self-lubricating, the core or string of balls may be molded of a fibrous or glass-filled plastic such as nylon or Delrin, one such being available under the trade-name Fiberfill. The core so molded possesses great inherent strength and high resistance to wear, as well as a low coefficient of friction.

The tube or sheath enclosing the core may be of either flexible or rigid molded plastic, aluminum, or other suitable material offering but little frictional resistance to core movement therein. Flexibility or rigidity of the tube will ordinarily be dictated by the nature of any given installation or application; that is, when the driving and driven elements in a particular installation are axially aligned, or disposed at a fixed angularity, the sheath or tube of the transmission device may be rigid or inflexible, whereas in circumstances involving changing disposition of the driving and driven elements, or difficult serpentine applications, the tube or sheath may be flexible in character.

Core 20 is of one-piece solid construction and may be fabricated economically by continuous molding process. The space between consecutive balls 24 is, of course, determined by the length of spacers 26. In general, the length of a spacer 26 may vary, depending upon the severity of any bends to be formed in the tube or sheath 22. If a tube or sheath is to be bent on a short radius at any location, best performance of the transmission device is obtained by utilizing a core having closely spaced balls 24. The balls may be more widely spaced when a tube or sheath is straight, or bent gradually on a large radius. The length of a spacer 26 ordinarily will be less than twice the diameter of a ball 24, and may be considerably shorter in most instances.

FIG. 1 illustrates a typical worm and wheel arrangement, wherein core 20 is trained about a pulley 84 with the balls or beads of the core engaging the thread 86 of a worm 88 adapted for rotation by means of a knob or handle 90. If desirable or necessary, the knob or handle may carry a calibrated dial 92 as shown.

By rotating the knob 90, the reaches of core 20 may be sent through tubes or sheaths which are parallel to the axis of worm 88 as indicated by full lines upon FIG. 1, or if preferred, the core may be sent at an angle to the worm axis as suggested by broken lines 94. As will be understood, the parts are to be supported within a housing, indicated at 96 of FIG. 4.

The detail view, FIG. 3, shows how the balls or beads 24 and spacers 26 of the core engage the worm thread and the pulley or sprocket 84. The view suggests also a modification, wherein the balls or beads bear against a stationary track or guide 98 serving to keep the balls or beads in firm registry with the worm thread. When guide 98 is employed, the sprocket or pulley 84 is to be omitted from the assembly.

The device of FIG. 2 contains within its housing 100 all the elements of FIG. 1, including a pulley or sprocket like 84 and a cooperating worm rotatable by means of knob 102; however, the housing 100 is equipped with a reservoir tube 104 in which may be stored the terminal end of the core housed by sheath 22. The reservoir tube 104 may be capped as at 106, if desired; or as an alternative, tube 104 may be replaced by a tube or sheath substantially coextensive with tube 22 to form a closed loop system. As in FIG. 1, the core utilized in the FIG. 2 structure wraps half-way around the pulley or sprocket thereof, and is kept in contact therewith by an inner wall of the housing which follows the contour of the pulley or sprocket.

As will be understood, the devices of FIGS. 1 to 4 employing a worm drive are self-locking in that the core cannot rotate the worm and its operating knob, although the worm and knob can readily move and actuate the core at all times.

The characters 110 in the several drawing figures indicate holes provided in the unit housings for receiving screws or other fasteners to mount the units upon appropriate supports, when necessary or desirable.

The devices and their components herein disclosed may be dimensioned and constructed as required, to perform either light or heavy duty service under various conditions and circumstances. It is pointed out, however, that even in the heavy duty class, the core 20 and sheath 22 need not assume unduly large proportions in order to carry heavy work loads. For example, it is found that service of a relatively heavy nature can be performed by a small core molded of glass-filled nylon or Fiberfill, wherein the ball diameter approximates .060 inch and the diameter of the spacers approximates .030 inch, with the balls spaced on 3/16 inch centers. A core so dimensioned performs smoothly and efficiently in a nylon or vinyl sheath or tube having an inside diameter of .064 inch. The sheath or tube, if required to flex with ease, may have a wall thickness approximating .030 inch. If relative rigidity of the sheath or tube is required, its wall thickness may approximate .064 inch.

The plastic material of which the core is molded endows the core with great resistance to stretch and twist, although it readily may be bent laterally. Such a core slides or rotates within a sheath of plastic or metal with negligible frictional drag, and is self-lubricating and practically indestructible from the standpoints of wear and breakage. The core moreover is readily produced economically and accurately by existing high-speed production equipment.

The molded core produced as herein set forth possesses the great advantage that, working with a sheath under load, it may be driven in either direction of rotation with equal effectiveness and without injury thereto, thereby distinguishing it from flexible twisted-wire cores which have a single preferred direction of rotation.

Since the core and sheath, and possibly other elements of the transmission system, may be formed of light-weight dielectric materials, they are well suited for the remote control of electronic equipment and other mechanisms in which electrical or magnetic interference, weight, compactness, and lubrication considerations are vital or important factors. The device of the invention requires no lubrication, and its durability is such that once it has been installed, no attention thereto is likely to be required.

What is claimed is:

1. A motion and power transmission device comprising in combination, a flexible one-piece core of plastic in the form of alternate substantially spherical beads, and spacers connecting said beads, the beads being integral with and uniformly spaced apart by said spacers, a hollow housing having inlet and outlet ports for movement of the flexible core therethrough, a rotary worm disposed near one of said ports and having a spiral thread in which the beads partially seat, a rotary wheel journaled for rotation upon the housing, with the axis of rotation thereof at right angles to the axis of rotation of the worm, said wheel including a rim portion tangent to the remaining port of the housing for directing the core to and from the housing interior, said wheel rim portion being spaced from the worm thread a distance less than the diameter of a bead whereby at least one bead of the core is pressed between the worm thread convolutions by the rim portion of the wheel, said wheel being in a plane which includes the axis of the worm, and means for rotating the worm.

2. The combination as set forth in claim 1, wherein is included sheath means associated with the housing ports to receive the core and direct the latter toward and from the housing.

3. A motion and power transmission device comprising in combination, a flexible one-piece core of plastic in the form of alternate substantially spherical beads, and spacers connecting said beads, and beads being integral with and uniformly spaced apart by said spacers, a hollow housing having inlet and outlet ports for movement of the flexible core therethrough, a rotary worm disposed near one of said ports and having a spiral thread in which the beads partially seat, a rotary wheel journaled for rotation upon the housing, with the axis of rotation thereof at substantial right angles to the axis of rotation of the worm, said wheel including a rim portion tangent to the remaining port of the housing for directing the core to and from the housing interior, said rim portion of the wheel having a line of depressions formed therein complementary to the beads of the core and in which the beads seat consecutively as the wheel rotates, the base of a given depression being spaced from the base of the worm thread a distance approximating the diameter of a bead, when such given depression is closest to the worm axis, said wheel being in a plane which includes the axis of the worm, and means for rotating the worm.

References Cited by the Examiner

UNITED STATES PATENTS

| | | | |
|---|---|---|---|
| 572,593 | 12/96 | Barney | 74—216.3 |
| 1,346,625 | 7/20 | Woodward | 74—216.3 |
| 2,231,556 | 2/41 | Arpin | 264—157 |
| 2,264,549 | 12/41 | Pecker | 74—424.6 |
| 2,338,869 | 1/44 | Porter | 74—501 |
| 2,593,469 | 4/52 | Mason | 264—157 |
| 2,825,231 | 3/58 | Wasko. | |
| 2,856,752 | 10/58 | Bahr. | |
| 2,869,377 | 1/59 | Pieterse | 74—216.3 |
| 3,043,120 | 7/62 | Waldron. | |

FOREIGN PATENTS

| | | |
|---|---|---|
| 438,735 | 3/12 | France. |
| 715,484 | 9/31 | France. |
| 870,683 | 6/61 | Great Britain. |

DON A. WAITE, *Primary Examiner.*